(No Model.)
E. WESTON.
ELECTRICAL MEASURING INSTRUMENT.
No. 442,843. Patented Dec. 16, 1890.
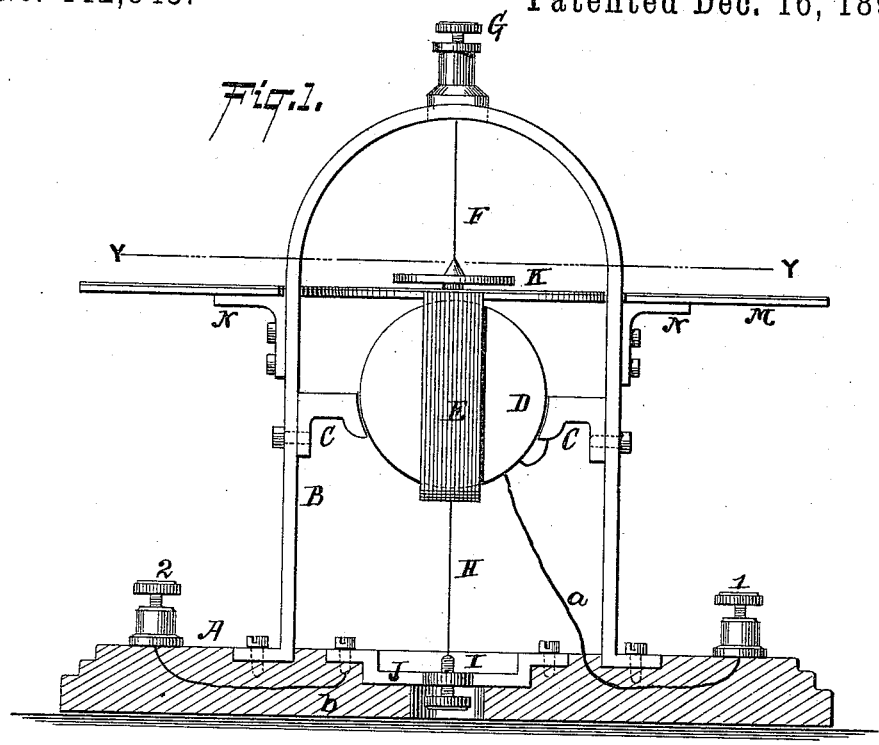
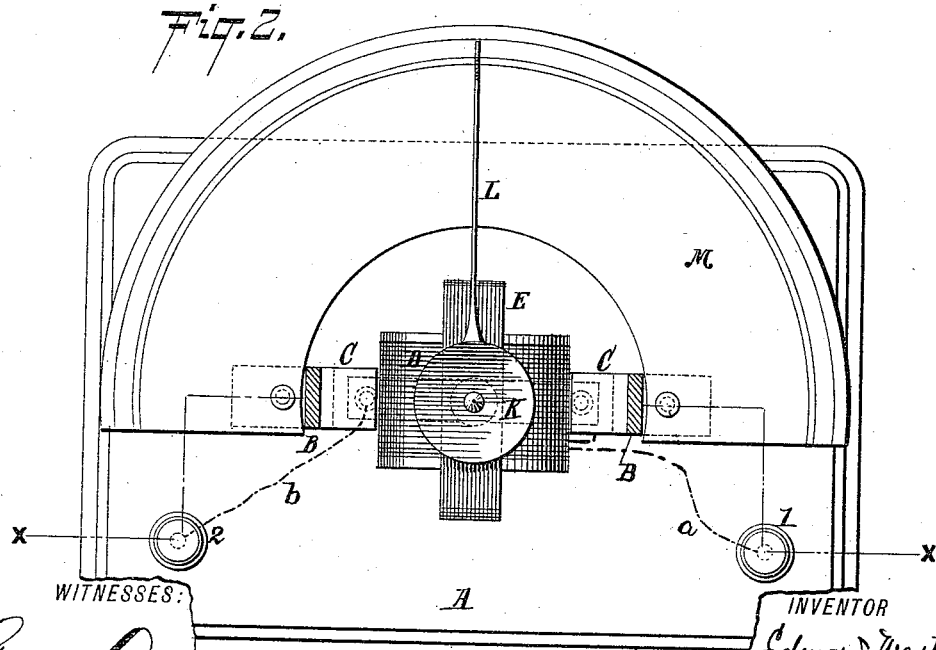
WITNESSES:
Gustave Dieterich.
William Goebel.
INVENTOR
Edward Weston
BY Park Benjamin
his ATTORNEY.

UNITED STATES PATENT OFFICE.

EDWARD WESTON, OF NEWARK, NEW JERSEY.

ELECTRICAL MEASURING-INSTRUMENT.

SPECIFICATION forming part of Letters Patent No. 442,843, dated December 16, 1890.

Application filed July 1, 1890. Serial No. 357,333. (No model.)

*To all whom it may concern:*

Be it known that I, EDWARD WESTON, of Newark, Essex county, New Jersey, have invented a new and useful Improvement in Electrical Measuring-Instruments, of which the following is a specification.

My invention relates to an apparatus for measuring difference of potential in an electrical current established between terminals; and it consists in the construction hereinafter set forth, embodying a fixed coil, and a movable coil suspended in the field of force of said fixed coil by a filament, the said coils being electrically connected. On the establishment of a current through the coils the movable coil is deflected to an extent depending upon the difference of potential existing between the terminals of the device, and the amount of deflection is indicated by a needle moving over a suitable scale.

In the accompanying drawings, Figure 1 is a vertical section of the instrument on the line X X of Fig. 2. Fig. 2 is a horizontal section on the line Y Y of Fig. 1.

Similar letters of reference indicate like parts.

A is the base of the instrument, carrying the arched frame B, of metal. Supported in said frame by brackets C is a coil D of insulated wire. Surrounding coil D is a coil E also of insulated wire and suspended by a fine wire F, which is connected to an adjusting-screw G in the frame B. To the opposite side of the coil E is connected another wire H, which is secured to an adjusting-screw I, which passes through the plate J, which is fastened to the base A. Supported on the coil E is a disk K, which carries an index-needle L. The needle L moves over a scale-plate M, which is supported on brackets N on the frame B, and is suitably marked.

The circuit in the instrument proceeds from binding-post 1 by wire $a$ to coil D, to bracket C, to frame B, and thence by the suspension-wire F to and through the coil E to wire H, plate J, and thence by wire $b$ to binding-post 2.

When a current traverses the instrument, the movable coil E assumes an angular position dependent upon the difference of potential between the binding-posts 1 and 2, and the extent of the movement of said coil is indicated by the needle L on the scale-plate M.

The movement of the coil is opposed by the torque of the wires F and H, which, when the current ceases, brings the coil back to its zero or normal position.

I claim—

1. In an electrical measuring-instrument, a coil, a second coil supported between two filaments connected to opposite sides and in the field of force of said first coil, and means for indicating the extent of rotary movement of said second coil, said coils being electrically connected.

2. In an electrical measuring-instrument, a coil, and in the field of force thereof a second coil supported between two filaments connected to opposite sides of said second coil and to adjusting-screws, and means for indicating the extent of rotary movement of said second coil, said coils being electrically connected.

3. In an electrical measuring-instrument, the fixed coil D and frame B, supporting said coil, the movable coil F, suspended between filaments F H, the scale N, and needle L, and circuit-connections, substantially as set forth.

EDWARD WESTON.

Witnesses:
R. C. FESSENDEN,
K. W. ELY.